US011905721B2

(12) United States Patent
Frei et al.

(10) Patent No.: US 11,905,721 B2
(45) Date of Patent: Feb. 20, 2024

(54) PROTECTIVE PLATFORM ASSEMBLY FOR USE DURING ELEVATOR INSTALLATION

(71) Applicant: OTIS ELEVATOR COMPANY, Farmington, CT (US)

(72) Inventors: Kurt J. Frei, Las Vegas, NV (US); Douglas N. Datema, Grand Rapids, MI (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 386 days.

(21) Appl. No.: 17/376,528

(22) Filed: Jul. 15, 2021

(65) Prior Publication Data

US 2023/0021058 A1 Jan. 19, 2023

(51) Int. Cl.
*E04G 21/32* (2006.01)
*B66B 19/00* (2006.01)

(52) U.S. Cl.
CPC .............. *E04G 21/32* (2013.01); *B66B 19/00* (2013.01)

(58) Field of Classification Search
CPC ................................ E04G 21/32; B66B 19/00
USPC ............................................................... 52/40
See application file for complete search history.

(56) References Cited

U.S. PATENT DOCUMENTS

| | | | | |
|---|---|---|---|---|
| 3,752,261 | A * | 8/1973 | Bushnell, Jr. | E04G 1/22 182/115 |
| 2013/0112500 | A1 | 5/2013 | Keersmaekers | |
| 2019/0110446 | A1 * | 4/2019 | Bryant | A01K 47/06 |

FOREIGN PATENT DOCUMENTS

| | | | |
|---|---|---|---|
| CN | 206503349 | U | 9/2017 |
| CN | 109399432 | A | 3/2019 |
| WO | 2012006693 | A1 | 1/2012 |
| WO | 2020142001 | A1 | 7/2020 |

OTHER PUBLICATIONS

Extended European Search Report for Application No. EP 22 18 2695.1 dated Nov. 28, 2022.

* cited by examiner

*Primary Examiner* — Mark R Wendell
(74) *Attorney, Agent, or Firm* — Carlson, Gaskey & Olds, P.C.

(57) ABSTRACT

An illustrative example embodiment of an assembly includes a first platform and at least one first brace associated with the first platform. The first brace is configured to engage a surface in or near a hoistway for supporting the first platform in a vertical location near the surface. A portion of the first brace is moveable relative to the first platform between an extended position for engaging the surface and a retracted position for allowing the first platform to move relative to the surface. A second platform is vertically spaced from the first platform. An adjustment mechanism associated with the first platform and the second platform facilitates adjusting a vertical spacing between the first platform and the second platform.

25 Claims, 5 Drawing Sheets

PROTECTIVE PLATFORM ASSEMBLY FOR USE DURING ELEVATOR INSTALLATION

BACKGROUND

Elevator system components are often installed during the early stages of construction of a building. Installation personnel typically work within the hoistway. Various devices are known that facilitate the installation process, such as lifts that allow installation personnel to reach various heights within the hoistway.

Since the building is still under construction, the openings to the hoistway that will eventually be closed by elevator hallway doors typically remain open during elevator installation. Other construction on or in the building is ongoing at the same time. Since the openings to the hoistway are open, it is possible for something to fall into the hoistway. Protective barriers have been constructed on site to avoid an item that falls into the hoistway from dropping all the way into the area where the elevator installation personnel are working.

Such barriers are relatively cumbersome and require construction workers to spend an appreciable amount of time building and installing the barrier. Elevator installation personnel typically have to wait for the construction workers to build or install a barrier at one level and then disassemble and relocate the barrier at another level. This delays elevator installation and distracts the construction workers from their building construction tasks. Such inefficiencies introduce additional cost and aggravation for the elevator installation personnel and the construction workers.

SUMMARY

An illustrative example embodiment of an assembly includes a first platform and at least one first brace associated with the first platform. The first brace is configured to engage a surface in or near a hoistway for supporting the first platform in a vertical location near the surface. A portion of the first brace is moveable relative to the first platform between an extended position for engaging the surface and a retracted position for allowing the first platform to move relative to the surface. A second platform is vertically spaced from the first platform. An adjustment mechanism associated with the first platform and the second platform facilitates adjusting a vertical spacing between the first platform and the second platform.

In addition to one or more of the features described above, or as an alternative, the portion of the at least one first brace is moveable in a horizontal direction relative to the first platform.

In addition to one or more of the features described above, or as an alternative, the first platform has a surface area configured to correspond to a space within an elevator hoistway, and the portion of the at least one first brace extends beyond the surface area of the first platform when the portion is in the extended position.

In addition to one or more of the features described above, or as an alternative, the assembly includes an adjuster for selectively moving the portion of the at least one first brace relative to the first platform.

In addition to one or more of the features described above, or as an alternative, the adjuster includes a threaded rod, and rotation of the threaded rod causes movement of the portion of the at least one first brace between the retracted position and the extended position.

In addition to one or more of the features described above, or as an alternative, the assembly includes a channel support connected to the first platform and wherein the portion of the at least one first brace is at least partially received in and moveable relative to the channel support.

In addition to one or more of the features described above, or as an alternative, the at least one first brace comprises a plurality of first braces and each of the first braces includes a portion that is moveable between the extended position and the retracted position.

In addition to one or more of the features described above, or as an alternative, two of the portions extend beyond a first edge of the first platform in the extended position, two others of the portions extend beyond a second edge of the first platform, the first edge is parallel to the second edge, and the first edge is opposite from the second edge.

In addition to one or more of the features described above, or as an alternative, the assembly includes at least one second brace associated with the second platform and configured to engage a surface in or near a hoistway for supporting the second platform in a vertical location near the surface, a portion of the at least one second brace being moveable relative to the second platform between an extended position for engaging the surface and a retracted position for allowing the second platform to move relative to the surface.

In addition to one or more of the features described above, or as an alternative, the at least one first brace is situated beneath the first platform, and the at least one second brace is situated beneath the second platform.

In addition to one or more of the features described above, or as an alternative, the at least one first brace comprises a plurality of first braces, each of the first braces includes a portion that is moveable between the extended position and the retracted position, the at least one second brace comprises a plurality of second braces, and each of the second braces includes a portion that is moveable between the extended position and the retracted position.

In addition to one or more of the features described above, or as an alternative, two of the portions of the first braces extend beyond a first edge of the first platform in the extended position, two others of the portions of the first braces extend beyond a second edge of the first platform, the first edge of the first platform is parallel to the second edge of the first platform, the first edge of the first platform is opposite from the second edge of the first platform, two of the portions of the second braces extend beyond a first edge of the second platform in the extended position, two others of the portions of the second braces extend beyond a second edge of the second platform, the first edge of the second platform is parallel to the second edge of the second platform, and the first edge of the second platform is opposite from the second edge of the second platform.

In addition to one or more of the features described above, or as an alternative, the assembly includes a personnel support that is configured to allow at least one individual to be situated inside a hoistway during an elevator installation process, and wherein the second platform is supported on or above a top of the personnel support.

In addition to one or more of the features described above, or as an alternative, the adjustment mechanism comprises a pantograph.

In addition to one or more of the features described above, or as an alternative, the adjustment mechanism comprises an electrical scissors mechanism.

In addition to one or more of the features described above, or as an alternative, the portion of the at least one first brace is configured to engage a surface within a hoistway when the portion is in the extended position, and the assembly includes a second portion of the at least one first brace that is configured to be received on a surface aligned with an opening into the hoistway when the second portion is in the extended position.

An illustrative example embodiment of a method of protecting personnel in a hoistway during an elevator system installation includes situating a first platform in the hoistway, situating a second platform in the hoistway, adjusting a spacing between the first platform and the second platform such that the first platform is at a first vertical location and the second platform is at a second vertical location that is different than the first vertical location, and engaging a support surface with at least one first brace associated with the first platform to maintain the first platform at the first vertical location.

In addition to one or more of the features described above, or as an alternative, the method includes engaging a support surface with at least one second brace associated with the second platform to maintain the second platform at the second vertical location.

In addition to one or more of the features described above, or as an alternative, engaging the support surface with the at least one first brace comprises engaging support surfaces on opposite sides of the hoistway with respective portions of the at least one first brace, and engaging the support surface with the at least one second brace comprises engaging support surfaces on opposite sides of the hoistway with respective portions of the at least one second brace.

In addition to one or more of the features described above, or as an alternative, engaging the support surface comprises moving at least a portion of the at least one first brace relative to the first platform such that the portion extends beyond an edge of the first platform into a position where the portion can engage the support surface.

The various features and advantages of at least one disclosed example embodiment will become apparent to those skilled in the art from the following detailed description. The drawings that accompany the detailed description can be briefly described as follows.

DETAILED DESCRIPTION

Figure 1:
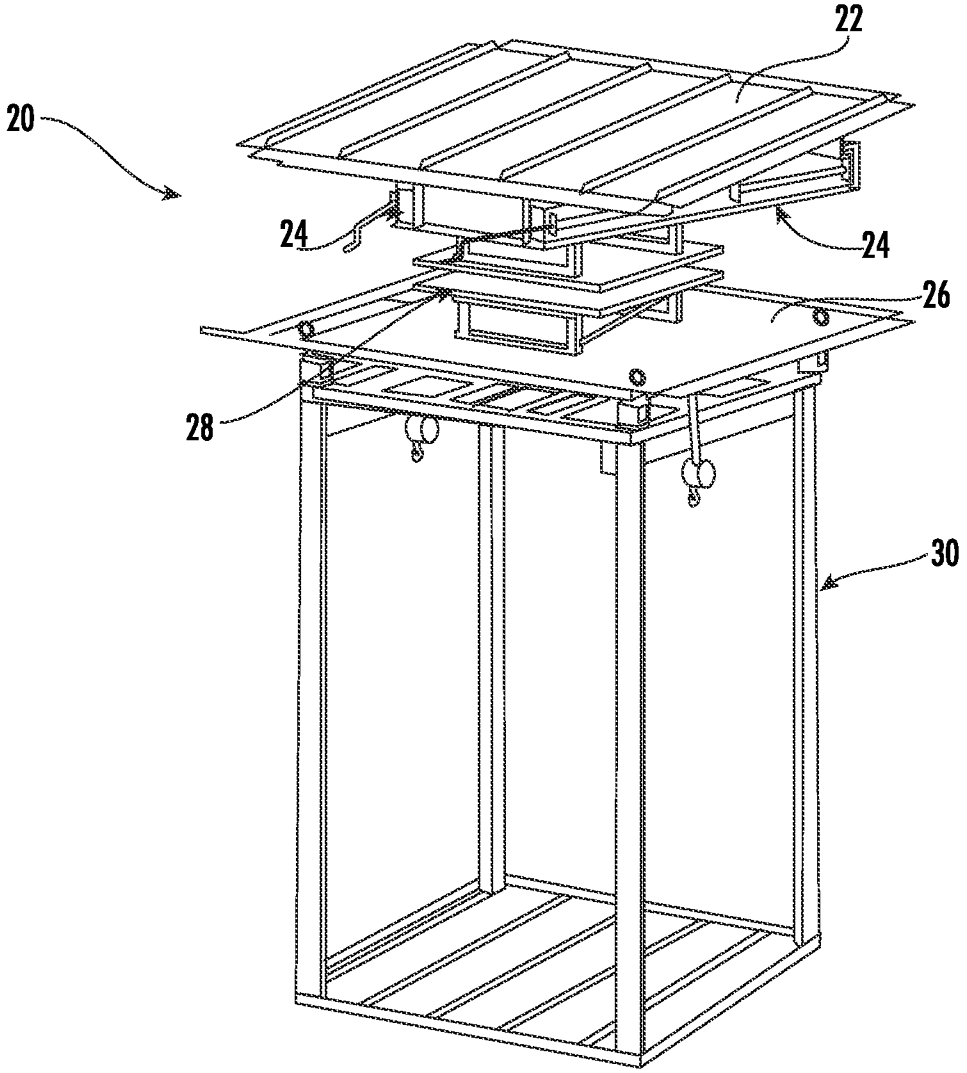
FIG. 1 diagrammatically illustrates selected portions of an example embodiment of a protective platform assembly useful during elevator system installation.

FIG. 1 schematically illustrates an example embodiment of an assembly 20 for protecting personnel within a hoistway during elevator system installation. The assembly 20 includes a first platform 22 that is configured to withstand an impact of an item that drops onto the first surface to protect any individual below the first platform 22. The first platform 22 has a length and width that establish a surface area of the first platform that corresponds to a cross-sectional area of the hoistway. The surface area of the first platform 22 is large enough to provide such protection and allow the first platform 22 to be selectively moved vertically within the hoistway.

At least one first brace 24 is associated with the first platform 22. There illustrated example embodiment includes a plurality of first braces 24. The first braces 24 are configured to engage nearby surfaces to support the first platform 22 in a selected vertical location within the hoistway.

A second platform 26 is spaced from the first platform 22. In the illustrated example embodiment, the second platform 26 is beneath the first platform 22. The second platform 26 is also configured to withstand an impact of an object that falls onto the second platform 26. The second platform 26 provides a second, redundant protective barrier above any installation personnel beneath the second platform 26.

An adjustment mechanism 28 facilitates adjusting the vertical spacing between the first platform 22 and the second platform 26. In some embodiments, the adjustment mechanism includes a hydraulic lift table that extends or retracts to change the vertical spacing between the platforms 22 and 26. In other embodiments, the adjustment mechanism 28 includes an electrically powered scissor linkage or pantograph (as shown in FIG. 2, for example).

The second platform 26 in this example embodiment is supported above a lift 30 that the installation personnel may use to reach various heights along the hoistway during elevator system installation. The personnel lift 30 can be set in a desired location in the hoistway and held in that position using known equipment.

Figure 2:
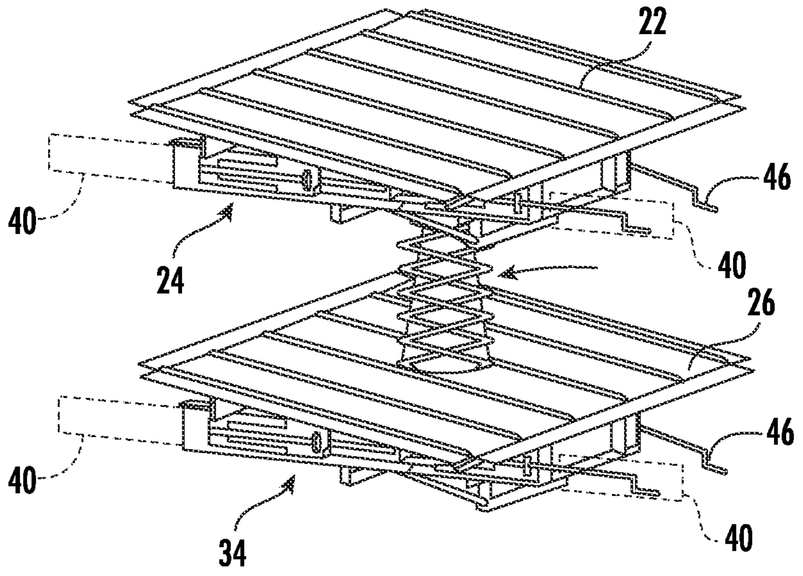
FIG. 2 diagrammatically illustrates selected portions of another example embodiment of a protective platform assembly.

FIG. 2 shows another embodiment in which the assembly 20 is independent of a personnel lift, such as the lift 30. In this example embodiment, the second platform 26 includes at least one second brace 34 that is configured to engage a support surface for maintaining the second platform 26 at a desired vertical location within the hoistway. This example embodiment includes a plurality of second braces 34 associated with the second platform.

Figure 3:
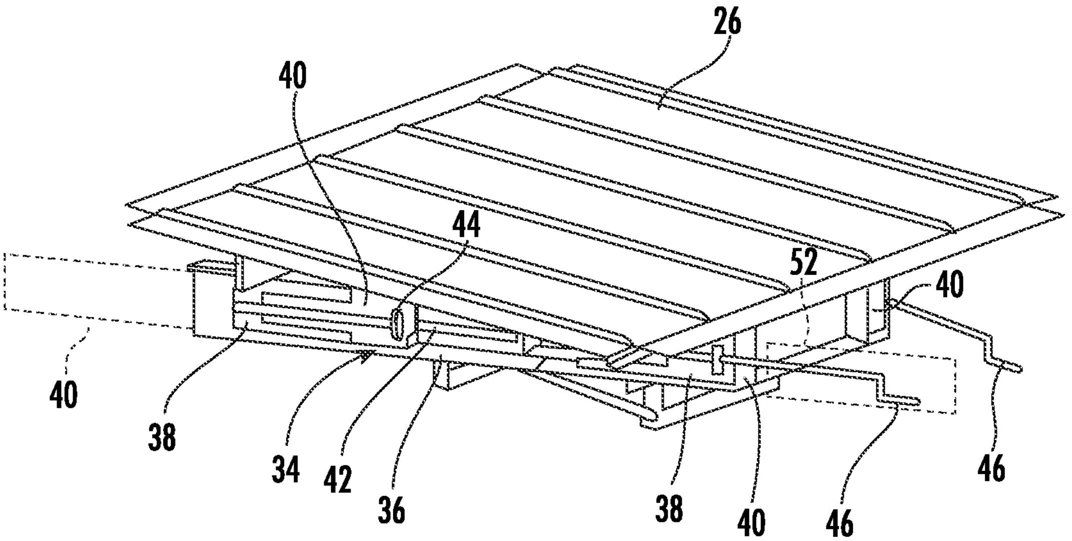
FIG. 3 diagrammatically illustrates selected portions of an example embodiment of a brace as used in the embodiments shown in FIGS. 1 and 2.

FIG. 3 shows an example arrangement of braces for supporting a platform 22, 26 at a desired vertical position in a hoistway. FIG. 3 shows the second platform 26 of FIG. 2. The brace configuration of the first platform 22 is the same as that shown in FIG. 3 in the illustrated example embodiments.

The second braces 34 each include a base 36 that is secured to the second platform 26 beneath the platform. The connection between the base 36 and the second platform 26 is stable and secure. Channel supports 38 are located near opposite ends of the base 36. Moveable portions 40 of the second braces 34 are received in the channel supports 38. The moveable portions 40 are metal rods or beams, for example. A threaded rod 42 is rotatable relative to the base 36 and the channel supports 38. Threaded followers 44 are coupled with the moveable portions 40. As the threaded rod 42 rotates, the followers 44 move along the threaded rod 42, causing the moveable portions 40 to move along the channel supports 38 between a retracted position shown in FIG. 3 to an extended position shown in broken lines in FIG. 3.

This example embodiment includes handles 46 for manually rotating the threaded rods 42 to selectively adjust the position of the moveable portions 40 relative to the second platform 26. Other embodiments include adaptors that allow an individual to use a powered driver or drill to rotate the threaded rods 42.

Figure 4:
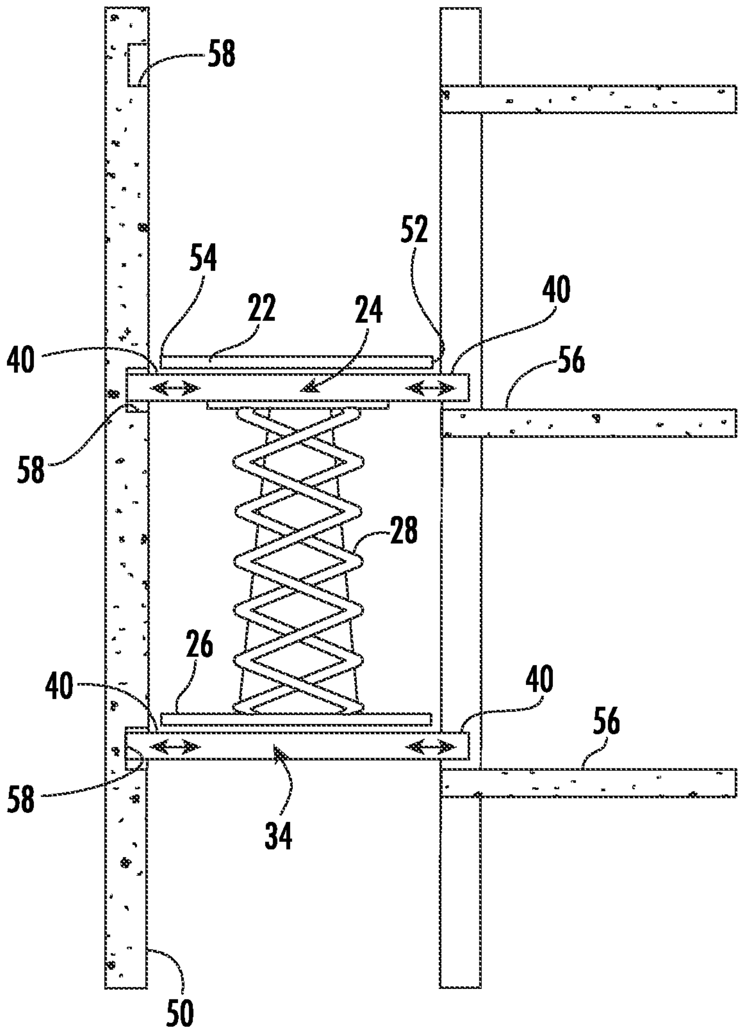
FIG. 4 schematically shows selected portions of the example embodiment shown in FIG. 2 in use during elevator installation.

As shown in FIG. 4, the first platform 22 is situated in a selected first vertical location within a hoistway 50. The first braces 24 (only one is visible in FIG. 4) are adjusted so that the moveable portions 40 move from the retracted position shown in FIGS. 1-3 into an extended position where the moveable portions 40 engage support surfaces for maintaining the first platform 22 at the first vertical location.

In this example embodiment, two of the moveable portions 40 extend beyond a first edge 52 of the first platform 22 and two others of the moveable portions 40 extend beyond a second, opposite edge 54 of the first platform 22. In the illustrated position, the moveable portions 40 extending beyond the first edge 52 engage a support surface 56 that corresponds to a landing floor adjacent an opening into the hoistway 50 that eventually will include elevator hoistway doors. The moveable portions 40 extending beyond the second edge 54 engage support surfaces in pockets or recesses 58 in a wall of the hoistway 50. At least the moveable portions 40 that engage the support surfaces in the recesses 58 may be considered pawls.

With the first braces 24 in the condition shown in FIG. 4, the first braces maintain the first platform 22 at the first vertical location.

The second braces 34 associated with the second platform 26 are similarly situated to engage support surfaces at the second vertical location of the second platform 26.

Either of the platforms 22, 26 may be secured in the desired vertical location prior to the other. Once one of them is in a desired vertical location, the adjustment mechanism 28 may be used to position the other platform 26, 22 in its desired vertical location while the braces 24, 34 are in the retracted position. Once the platform is in the desired vertical location, the associated braces 24, 34 are moved relative to the platform into the extended position to maintain the platform at that location.

The braces 24, 34 effectively hold the respective platform 22, 26 in position to withstand the impact of an object that may drop into the hoistway from above the platform assembly 20. Any such object will encounter the first platform 22, protecting anyone beneath the assembly 20. In the event that the first platform 22 does not stop such an object for some reason, the second platform 26 provides redundant or fail-safe protection.

In FIG. 1, the desired position of the personnel lift 30 sets the vertical location of the second platform 26 within the hoistway. The adjustment mechanism 28 selectively adjusts the vertical location of the first platform 22 by raising or lowering the first platform 22 relative to the personnel lift 30 and the second platform 26. Once the first platform 22 is situated at the desired vertical position of the first platform 22, the moveable portions 40 of the first braces 24 are moved outwardly into the extended position like that shown in FIG. 4 to secure the first platform 22 in the first vertical location.

Figure 5:
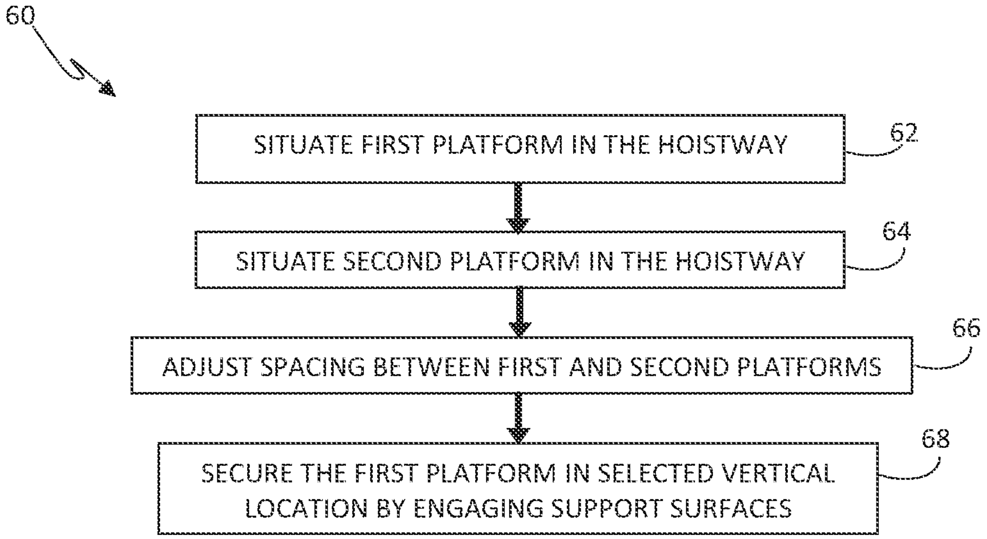
FIG. 5 is a flowchart diagram that summarizes an example method of protecting personnel in a hoistway during an elevator system installation.

FIG. 5 is a flowchart diagram 60 that summarizes an example method of protecting personnel in a hoistway during an elevator system installation. At 62, the first platform 22 is situated in a hoistway. At 64, the second platform 26 is situated in the hoistway. The adjustment mechanism 28 adjusts the spacing between the first platform 22 and the second platform 26 at 66. At 68, the first braces 24 secure the first platform 22 in a selected vertical location in the hoistway by engaging support surfaces.

The disclosed example embodiments provide an effective and efficient assembly for protecting personnel in a hoistway during elevator system installation, which may occur during ongoing building construction. There is no need for construction workers to be diverted to make and install a special barrier at various levels along the hoistway. Instead, the assembly 20 can be selectively positioned at various locations along the hoistway by the elevator installation personnel.

The various features of the disclosed example embodiments are not necessarily limited to those embodiments. Other combinations of such features are possible to realize additional or different embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An assembly, comprising:
a first platform;
at least one first brace associated with the first platform and configured to engage a surface in or near a hoistway for supporting the first platform in a vertical location near the surface, a portion of the at least one first brace being moveable relative to the first platform between an extended position for engaging the surface and a retracted position for allowing the first platform to move relative to the surface;
a second platform vertically spaced from the first platform, and wherein the second platform is configured to be spaced apart from an upper surface of a lift; and
an adjustment mechanism associated with the first platform and the second platform for adjusting a vertical spacing between the first platform and the second platform.

2. The assembly of claim 1, wherein the portion of the at least one first brace is moveable in a horizontal direction relative to the first platform.

3. The assembly of claim 2, wherein
the first platform has a surface area configured to correspond to a space within an elevator hoistway, and
the portion of the at least one first brace extends beyond the surface area of the first platform when the portion is in the extended position.

4. The assembly of claim 1, comprising an adjuster for selectively moving the portion of the at least one first brace relative to the first platform.

5. The assembly of claim 4, wherein
the adjuster includes a threaded rod, and
rotation of the threaded rod causes movement of the portion of the at least one first brace between the retracted position and the extended position.

6. The assembly of claim 4, wherein the adjuster includes a rod that rotates about an axis to move the at least one first brace between the retracted position and the extended position, and wherein a driving rotational input to the rod is about the same axis.

7. The assembly of claim 1, comprising a channel support connected to the first platform and wherein the portion of the at least one first brace is at least partially received in and moveable relative to the channel support.

8. The assembly of claim 1, wherein the at least one first brace comprises a plurality of first braces and each of the first braces includes a portion that is moveable between the extended position and the retracted position.

9. The assembly of claim 8, wherein
two of the portions extend beyond a first edge of the first platform in the extended position, two others of the portions extend beyond a second edge of the first platform,
the first edge is parallel to the second edge, and
the first edge is opposite from the second edge.

10. The assembly of claim 1, comprising at least one second brace associated with the second platform and configured to engage a surface in or near the hoistway for supporting the second platform in a vertical location near the surface, a portion of the at least one second brace being moveable relative to the second platform between an extended position for engaging the surface and a retracted position for allowing the second platform to move relative to the surface.

11. The assembly of claim 10, wherein
the at least one first brace is situated beneath the first platform, and
the at least one second brace is situated beneath the second platform.

12. The assembly of claim 1, wherein the lift comprises a personnel support that is configured to allow at least one individual to be situated inside a hoistway during an elevator installation process, and wherein the second platform has a lower surface that is spaced apart from a top of the personnel support.

13. The assembly of claim 1, wherein the adjustment mechanism comprises a pantograph.

14. The assembly of claim 1, wherein the adjustment mechanism comprises an electrical scissors mechanism.

15. The assembly of claim 1, wherein
the portion of the at least one first brace is configured to engage a surface within a hoistway when the portion is in the extended position, and
the assembly includes a second portion of the at least one first brace that is configured to be received on a surface aligned with an opening into the hoistway when the second portion is in the extended position.

16. The assembly of claim 1, comprising at least one second brace associated with the second platform and configured to engage a surface in or near the hoistway to support the second platform in a vertical location that is different than the vertical location for the first platform, and wherein the at least one second brace extends underneath the second platform in a gap between a lower surface of the second platform and the upper surface of the lift.

17. An assembly, comprising:
a first platform;
at least one first brace associated with the first platform and configured to engage a surface in or near a hoistway for supporting the first platform in a vertical location near the surface, a portion of the at least one first brace being moveable relative to the first platform between an extended position for engaging the surface and a retracted position for allowing the first platform to move relative to the surface, and wherein the at least one first brace is situated beneath the first platform;
a second platform vertically spaced from the first platform;
at least one second brace associated with the second platform and configured to engage a surface in or near the hoistway for supporting the second platform in a vertical location near the surface, a portion of the at least one second brace being moveable relative to the second platform between an extended position for engaging the surface and a retracted position for allowing the second platform to move relative to the surface, and wherein the at least one second brace is situated beneath the second platform; and
an adjustment mechanism associated with the first platform and the second platform for adjusting a vertical spacing between the first platform and the second platform, wherein
the at least one first brace comprises a plurality of first braces,
each of the first braces includes a portion that is moveable between the extended position and the retracted position,
the at least one second brace comprises a plurality of second braces, and
each of the second braces includes a portion that is moveable between the extended position and the retracted position.

18. The assembly of claim 17, wherein
two of the portions of the first braces extend beyond a first edge of the first platform in the extended position,
two others of the portions of the first braces extend beyond a second edge of the first platform,
the first edge of the first platform is parallel to the second edge of the first platform,
the first edge of the first platform is opposite from the second edge of the first platform,
two of the portions of the second braces extend beyond a first edge of the second platform in the extended position,
two others of the portions of the second braces extend beyond a second edge of the second platform,
the first edge of the second platform is parallel to the second edge of the second platform, and
the first edge of the second platform is opposite from the second edge of the second platform.

19. A method of protecting personnel in a hoistway during an elevator system installation, the method comprising:
situating a first platform in the hoistway;
situating a second platform in the hoistway;
spacing the second platform above an upper surface of a lift;
adjusting a spacing between the first platform and the second platform such that the first platform is at a first vertical location and the second platform is at a second vertical location that is different than the first vertical location; and
engaging a support surface with at least one first brace associated with the first platform to maintain the first platform at the first vertical location.

20. The method of claim 19, comprising
engaging a support surface with at least one second brace associated with the second platform to maintain the second platform at the second vertical location.

21. The method of claim 20, wherein
engaging the support surface with the at least one first brace comprises engaging support surfaces on opposite sides of the hoistway with respective portions of the at least one first brace; and
engaging the support surface with the at least one second brace comprises engaging support surfaces on opposite sides of the hoistway with respective portions of the at least one second brace.

22. The method of claim 21, comprising extending the at least one second brace underneath the second platform in a gap between a lower surface of the second platform and the upper surface of the lift.

23. The method of claim 19, wherein engaging the support surface comprises moving at least a portion of the at least one first brace relative to the first platform such that the portion extends beyond an edge of the first platform into a position where the portion can engage the support surface.

24. The method of claim 19, wherein adjusting the spacing between the first platform and the second platform further includes rotating a rod about an axis to move the at least one first brace between a retracted position and an extended position, and including providing a driving rotational input that rotates about the same axis.

25. The method of claim 19, comprising spacing the first platform at a first vertical distance relative to the upper surface of the lift, spacing the second platform at a second vertical distance relative to the upper surface of the lift that is less than the first vertical location, and spacing the second platform at a third vertical distance from the upper surface of the lift.

* * * * *